United States Patent
Tulpa et al.

(10) Patent No.: US 9,593,497 B2
(45) Date of Patent: Mar. 14, 2017

(54) NONSKID MAGNETIZED SAFETY MAT INCORPORATING NONSKID FLEX HINGED LOCATION FOR PROVIDING ADHERING SUPPORT WHEN PLACED UPON A METAL ROOF

(71) Applicants: Gregory Leslie Tulpa, Elk Rapids, MI (US); Neil A. Warner, Kewadin, MI (US)

(72) Inventors: Gregory Leslie Tulpa, Elk Rapids, MI (US); Neil A. Warner, Kewadin, MI (US)

(73) Assignee: Steel Grip Samm, Inc., Kewadin, MI (US)

( * ) Notice: Subject to any disclaimer, the term of this patent is extended or adjusted under 35 U.S.C. 154(b) by 0 days.

(21) Appl. No.: 14/531,274

(22) Filed: Nov. 3, 2014

(65) Prior Publication Data

US 2016/0123025 A1    May 5, 2016

Related U.S. Application Data

(60) Provisional application No. 61/899,321, filed on Nov. 4, 2013.

(51) Int. Cl.
*E04G 21/32* (2006.01)
*B32B 25/16* (2006.01)
*B32B 5/02* (2006.01)
*B32B 25/10* (2006.01)
(Continued)

(52) U.S. Cl.
CPC .......... *E04G 21/3214* (2013.01); *B32B 3/085* (2013.01); *B32B 5/02* (2013.01); *B32B 25/10* (2013.01); *B32B 25/14* (2013.01); *B32B 25/16* (2013.01); *B32B 2307/208* (2013.01); *B32B 2307/546* (2013.01); *B32B 2307/554* (2013.01); *B32B 2307/5825* (2013.01); *B32B 2307/744* (2013.01); *B32B 2419/06* (2013.01); *B32B 2471/04* (2013.01)

(58) Field of Classification Search
CPC ..... E04G 21/3214; B32B 15/06; B32B 25/16; B32B 37/18
USPC ...... 428/317.1, 900, 308.4; 52/749.12, 749.1
See application file for complete search history.

(56) References Cited

U.S. PATENT DOCUMENTS 3,102,314 A * 9/1963 Alderfer ............... A41D 1/002
                                                    24/303
3,440,748 A    4/1969 Hackley
(Continued)

FOREIGN PATENT DOCUMENTS

DE                444067              5/1927

*Primary Examiner* — Brian Mattei
*Assistant Examiner* — Paola Agudelo
(74) *Attorney, Agent, or Firm* — Dinsmore & Shohl LLP; Douglas J. McEvoy (57) ABSTRACT

An anti-skid mat utilized in the field of metal roofing and including a skid-resistant material exhibiting flexible properties and having a generally planar configuration with a length, width and thickness. A plurality of hinges or flex lines design into the material and which enable the material to conform to any irregular surface associated with the metal roof. Said material having a magnetic attracting underside such that placement of the material upon the metal roof securely supports the weight of a user standing on the mat without slippage relative to the roof.

1 Claim, 13 Drawing Sheets

(51) Int. Cl.
 B32B 25/14 (2006.01)
 B32B 3/08 (2006.01)

(56) References Cited

U.S. PATENT DOCUMENTS

| | | | | |
|---|---|---|---|---|
| 3,958,385 A * | 5/1976 | Bondra, Jr. | ............ | E04C 2/405 |
| | | | | 52/404.1 |
| 4,058,335 A * | 11/1977 | Abe | ............ | E05C 19/16 |
| | | | | 248/206.5 |
| 4,663,874 A * | 5/1987 | Sano | ............ | G09F 7/04 |
| | | | | 40/600 |
| 4,671,028 A * | 6/1987 | Figone | ............ | E04C 2/405 |
| | | | | 428/167 |
| 5,119,904 A | 6/1992 | Dierolf | | |
| 5,503,891 A * | 4/1996 | Marshall | ............ | B32B 27/18 |
| | | | | 40/600 |
| 5,524,317 A | 6/1996 | Nagahama et al. | | |
| 6,987,928 B2 | 1/2006 | Shields | | |
| 2003/0138620 A1* | 7/2003 | Fonseca | ............ | B32B 7/12 |
| | | | | 428/317.1 |
| 2004/0053002 A1* | 3/2004 | Kobayashi | ............ | A47L 23/266 |
| | | | | 428/95 |
| 2005/0075037 A1 | 4/2005 | Whitehead | | |
| 2010/0011691 A1 | 1/2010 | Anaya | | |
| 2010/0028589 A1* | 2/2010 | Van Houten | ............ | B27J 1/003 |
| | | | | 428/53 |
| 2011/0143615 A1* | 6/2011 | Gold | ............ | A47G 27/0206 |
| | | | | 442/1 |
| 2012/0222370 A1 | 9/2012 | Crookston | | |
| 2013/0199453 A1 | 8/2013 | Kalra | | |

* cited by examiner

NONSKID MAGNETIZED SAFETY MAT INCORPORATING NONSKID FLEX HINGED LOCATION FOR PROVIDING ADHERING SUPPORT WHEN PLACED UPON A METAL ROOF

CROSS-REFERENCE TO RELATED APPLICATIONS

This Application claims the benefit of U.S. Provisional Application 61/899,321 filed on Nov. 4, 2013, the contents of which are incorporated herein in its entirety.

FIELD OF THE INVENTION

The present invention discloses a mat, such as constructed of a neoprene or other Suitable nonskid surface material, and which incorporates a magnetic attracting underside for placement upon a metal roof and in order to provide nonskid support to a user standing on the roof, such as during both wet and dry conditions. The mat can integrate any type of hinged or flex capability which enables the mat to conform to any irregular surface associated with such as a sheet metal roof construction. The mats are further typically provided in plural fashion in order to provide any of a walkway or working surface upon the metal roof.

BACKGROUND OF THE INVENTION

In the field of construction, ascending or descending metal roofs or metal buildings can be hazardous. Many injuries and some deaths occur each year. Safety and efficiency are key in construction productivity. Construction and weather conditions, may challenge the ability of workers to maintain a safe footing.

In the field of building construction, problems incurred with metal roofs notably include safety while standing or walking. A layer of dew, dust, or pollen can create conditions of great hazard for walking metal roofs.

Safety harnesses are required in many areas, yet a worker maintaining a comfortable foothold can still be a concern and, in the course of a work day, can cause leg, ankle, knee, back stress. Many workers on metal roofs have encountered slippery dangerous conditions and fallen. In cases of sudden foul weather, such as rain or snow, loss of footing may cause workers to slip and fall from roofs or be trapped there.

As such, ascending and descending and standing, kneeling or crawling on any metal roof, can be hazardous and cause many injuries and deaths each year. Safety and efficiency are key in worker productivity in dealing with construction and weather conditions in order to maintain a safer foothold such as during installation of material and equipment and in presence of such hazards as including any of water/oil/silicones on the surface.

Damage to finished/painted metal surfaces is often incurred due to falls of workers and hand tools, and equipment due to loss of footing. In the field of metal roof construction and maintenance, workers incur conditions of rain or dust, a hazard which may cause insecure footing and falls. Standing on pitched roofs for hours is fatiguing on leg and back muscles. Lanyards, harnesses, and rib clamps are used in ferritic metal roof construction, yet do little to relieve workers' footing and muscle stress. Also in weather conditions of mist, fog, or rain, safely ascending and descending a pitched metal roof is extremely difficult. Each year many workers are injured and sometimes die in falls from ferritic metal roofs.

It is also known that steel roofing today mimics most known roofing styles such as asphalt shingles, cedar shakes, slate, and terra cotta. Whereas asphalt roofing today is a landfill problem, steel roofing is recyclable. Steel roofing has a long term service capability of up to 60 years or more with good maintenance.

Steel roofing is 100% recyclable with high durability and long-term roofing effectiveness. It offers the option of changing color simply by painting and upgrading an old roof's appearance, thereby, holding a higher value to business and home owner's investment. Yet to workers, roofers, painters, and maintenance people, slipping and falling from steel roofs is very hazardous resulting in may injuries and deaths each year. There is a clear need for providing workers safer ways to walk/traverse steel roofs. Structures such as water towers, tractors, and ship decks also present a footing problem.

In the field of steel roofing, many of the current safety systems do not address footing, sitting in place, or kneeling down positions. Lanyards or harnesses to protect against falls do little to steady or provide secure footing. In conditions of a steep pitch steel roof 6/12 or more, leg and back fatigue from insecure footing can be extreme on workers.

Accordingly, in view of the many hazardous and safety concerns associated with steel roofing and steel decking work, there is a clear need for an affordable, easy to use and safer footing system to be available to workers.

SUMMARY OF THE INVENTION

Thus the present invention addresses better safety for workers and reduced damage to finished surface of metal roofs. It is further, the object of the invention to provide a nonskid mat for surer footing for workers, reducing the number of injuries and providing better protection of finished surfaces on metal roofs, from dropped tools or equipment falling from tool belts. With the mat design of the present invention, a safer and more assured foothold is achieved, the mats being easily moved in all environmental conditions to provide the user with a safer way of ascending and descending a roof with reduced risk of injury.

It is yet a further object of the present invention, to provide a variety of types of magnetic mats to use which conform to surface construct of the steel roofing industry which produces a wide variety of steel roofing styles such as cedar shake, Spanish terra cotta, slate tile, and many others. The mats are further applicable to provide repositionable and antiskid support to any other ferritic metal surface, not limited to metallic decks on marine craft or the like. These and other objects and advantages of present invention are more readily apparent with reference to the detailed description and accompanying drawings.

BRIEF DESCRIPTION OF THE DRAWINGS

Reference will now be made to the attached drawings, when read in combination with the following detailed descriptions, wherein like reference numerals refer to like parts throughout the several views, and in which:

FIG. 16 is a sectional illustration taken from FIG. 15A and showing a quartered diamond style pattern associated with each of the flexible magnetic bottom layers in order to provide (greater) enhanced surface area contact when placed upon existing steel roofing, such as which can further exhibit a known imitation pattern not limited to cedar shake, terra cotta, slate tile or the like.

DETAILED DESCRIPTION OF THE PREFERRED EMBODIMENTS

As will be described in further detail with reference to the following illustrations, the present invention discloses a magnetically adhering mat, such as constructed of any suitable nonskid surface material, and which incorporates a magnetic attracting underside for placement upon a ferritic metal roof. In use, and as will be described with further reference to the following embodiments, the concepts of the invention are illustrated by the following figures. The figures are only meant to illustrate the concepts for the invention and in no way are intended to limit the scope of the invention in any manner. A plurality of similar configured mats are provided and are continuously applied and repositioned in order to provide nonskid support to a user standing on a roof such as typically exhibiting any degree of angle or pitch, with the mats providing adequate magnetic holding forces against the metal roof in either of wet and dry conditions. As will be additionally described, the mat can integrate any type of hinged or flex capability which enables the mat to conform to any irregular surface associated with such as a sheet metal roof construction.

Figure 1:
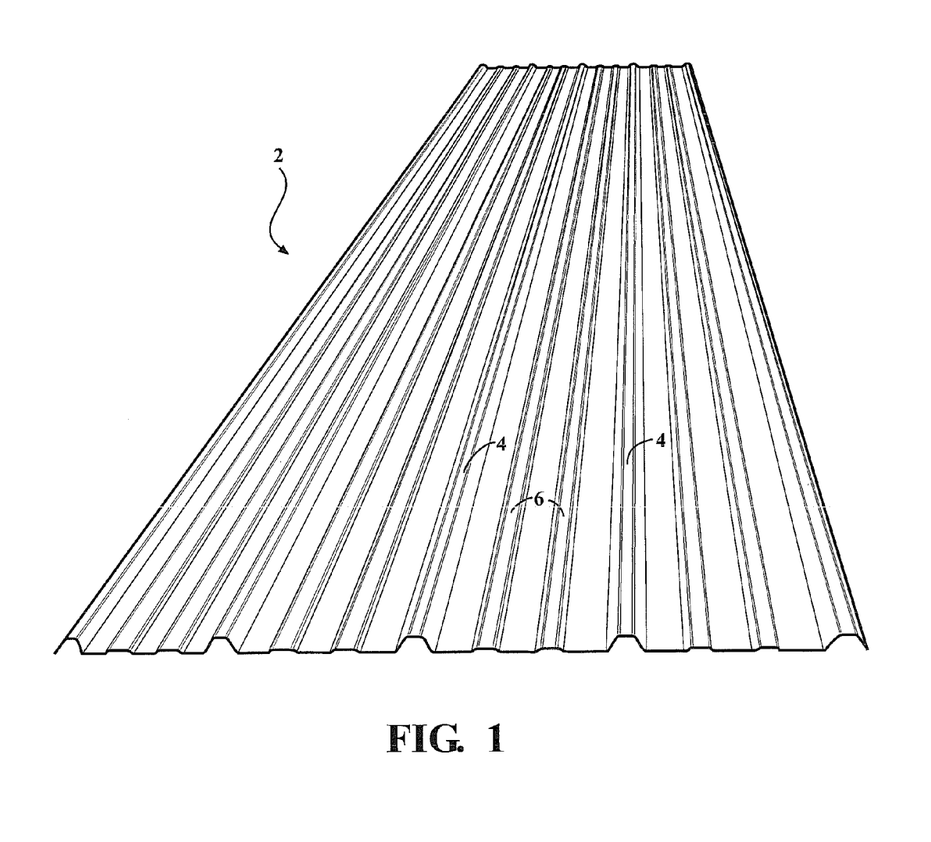
FIG. 1 is a side perspective of a sheet metal roof construction according to one known configuration and exhibiting an uneven surface profile.

Referring to FIG. 1, a side perspective is depicted of a sheet metal roof construction 2 according to one known configuration, and such as which can be of ferrite or other similar metal which exhibits desired magnetic attracting properties. Further shown in the selected example of the roofing construction 2 is any arrangement of structure associated with such as a stamped or otherwise configured sheet metal, this including such as alternating ribs 4, between which are located valleys with any further surfacing profiles 6. As will be described in reference to succeeding variants, the sheet metal configurations with which the present invention can be utilized can vary from that shown.

Figure 2:
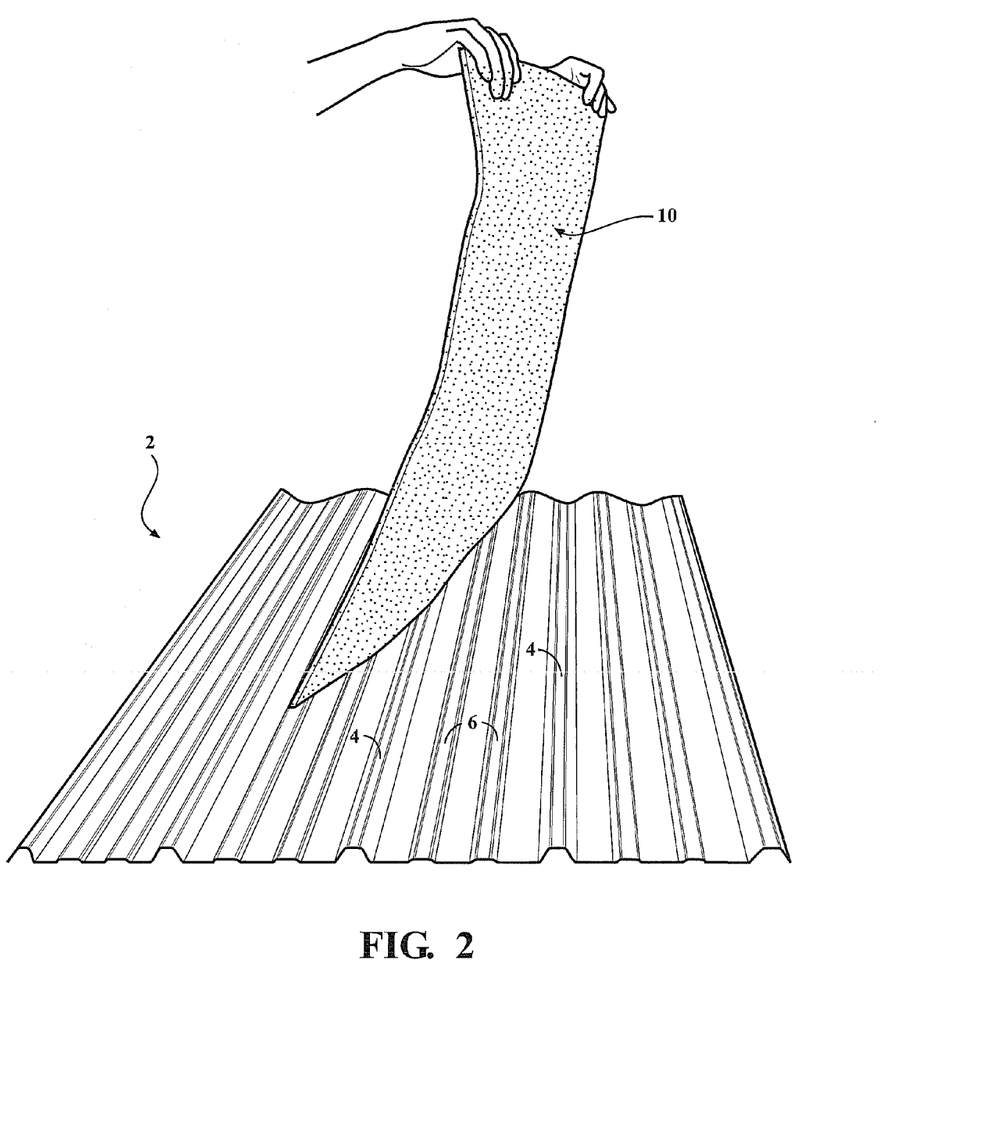
FIG. 2 is an illustration of the safety mat in a pre-applied position.

Referring to FIG. 2, an illustration is, as an example of a fully assembled safety mat 10 according to one non-limiting variant arranged in a pre-applied position relative to the metal roof 2. The safety mat exhibits a generally planar shape with any length and width dimension, and which can include, without limitation, any desired thickness such as in a range of ⅛" to ½".

In one non-limiting variant, the individual mats can exhibit dimensions provided in any plurality in order to cover a suitable area of the metal sheeting of the roof necessary for safely supporting the user thereupon. Without limitation, the shape, thickness and configuration of the mat is capable of being modified in order to provide a maximum degree of adhering (further defined as antiskid or shear force limiting) support upon the roof surface. This can include without limitation such as reconfiguring the individual magnetic sections in a quartered diamond or other suitable shape. Reference is also made to blown up view 12 depicted in FIG. 16.

Material constructions associated with the mat can include any suitable flexible material having sufficient nonskid surface properties, such as without limitation neoprene or other polymer based materials. Neoprene or poly-chloroprene is a family of synthetic rubbers that are produced by polymerization of chloroprene. Neoprene exhibits good chemical stability and maintains flexibility over a wide temperature range and, in the present application, provides the advantages of exhibiting good exterior and antiskid characteristics in either wet or dry conditions, along with limited stretchability. The purpose of the surface material used, regardless of construction, is to provide both nonskid support to the user when standing thereupon as well as to provide the necessary flexibility during application and successive repositioning upon the ferritic metal roof.

Figures 15A, 15B:
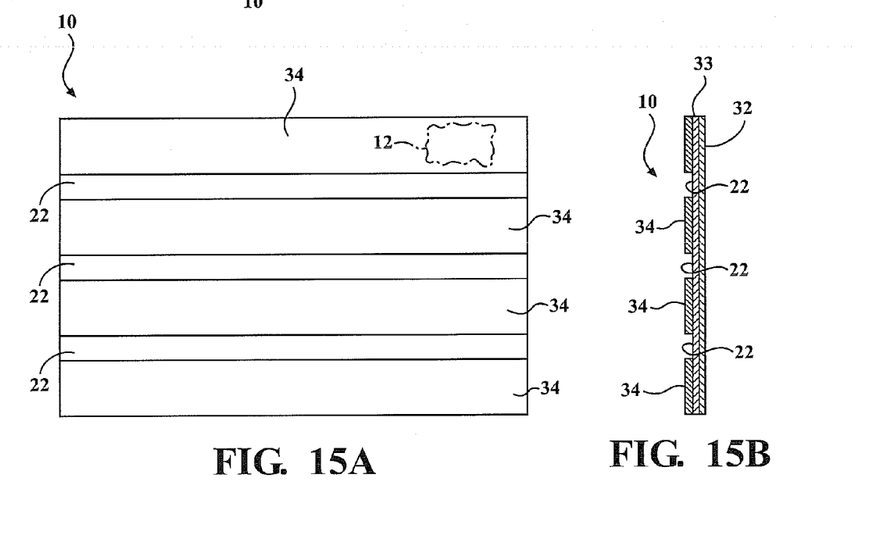
FIGS. 15A-15B are bottom and side view illustrations of a yet further and related variant of safety mats similar to FIGS. 14A-14B.
Figure 16:
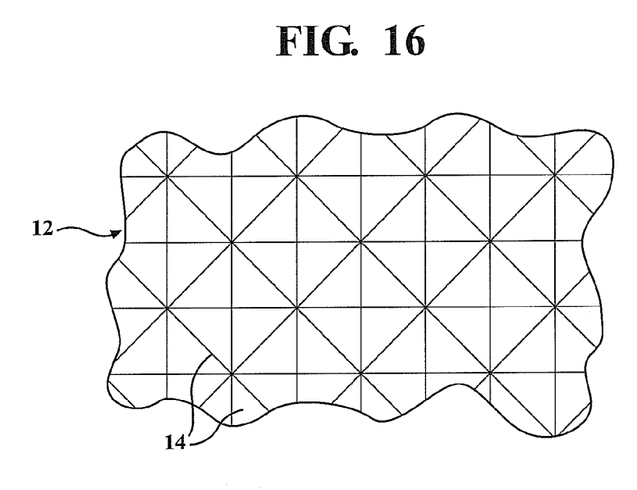

The mat 10 further includes a magnetic adhering underside layer, such as again best represented by the grid shaped material 14 depicted in FIG. 16. As will be described in further detail with reference to subsequent embodiments as in the underside view of magnetic strips 16 in FIG. 7. The construction of the mat is such that the backing magnetic layer can include, without limitation, and number of individual magnetic elements, such as flexible magnetic sheets or materials which can be integrated into the mat at spaced intervals in underside facing manner. Reference is also made to FIGS. 14A-14B and FIGS. 15A-15B. Alternately, a continuous magnetic (underside) layer 18 can be provided as illustrated in FIG. 13 and which is attached to an underside of neoprene strips or other suitable surfacing (antiskid) material such as by gluing, heat bonding or the like.

Figure 3:
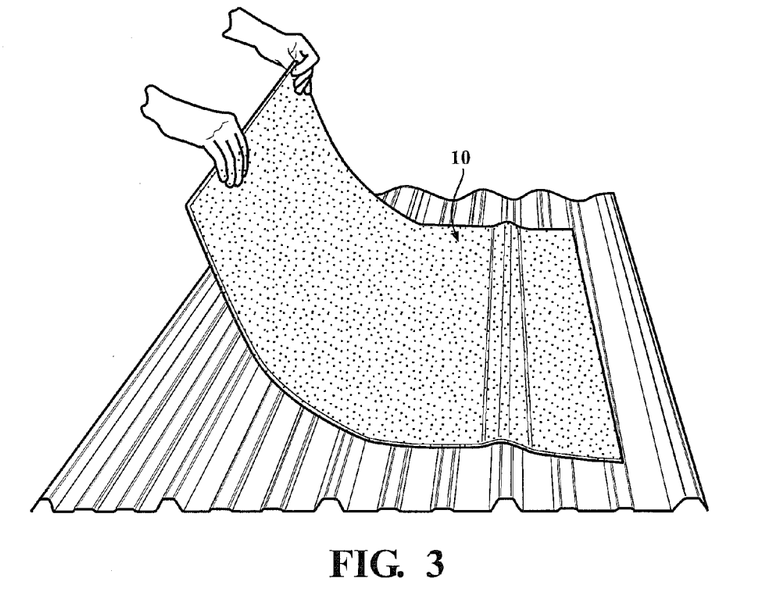
FIGS. 3-4 are successive illustrations of the safety mat in an intermediate applied and adhering position upon the metal roof.
Figure 4:
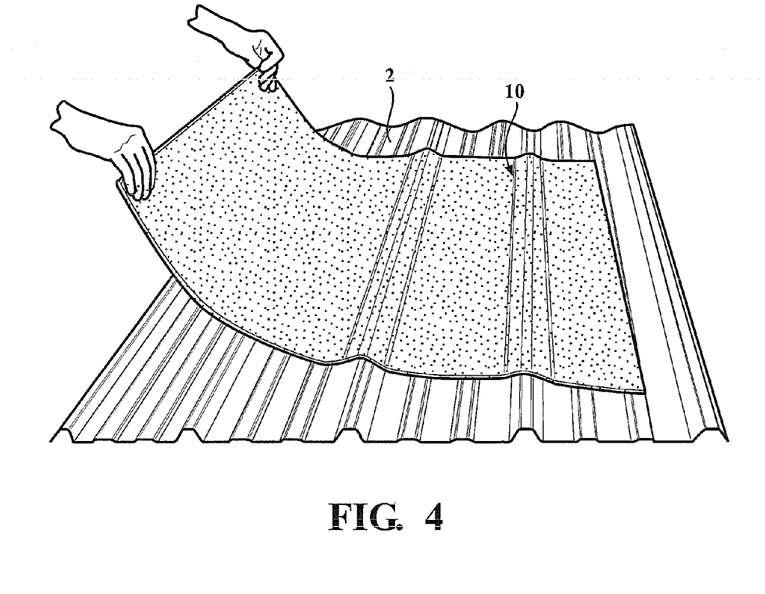
Figure 5:
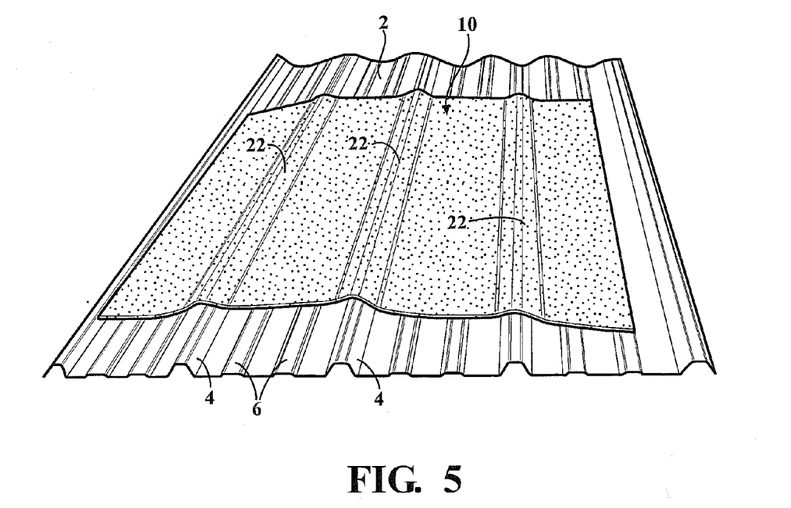
FIG. 5 is a fully applied illustration of the safety mat magnetically adhered to the metal roof exterior.

FIGS. 3-5 are successive illustrations of the safety mat 10 in each of pre-applied, intermediate applied and installed/adhering positions upon the metal roof 2. As best shown in FIG. 5, the flexible construction of the mat 10 is such that, upon it being magnetically adhered to the exterior surface of the roof 2, it exhibits a plurality of hinged or pivot locations, see at 22 which enables the mat to conform to the surface profile of the metal roof 2, as well as the subsequent roof design 2' of FIG. 6 (commercially referred to as corrugated steel roofing) which exhibits a continuous reverse angled and corrugated appearance (see angled portions 3, 5, 7, et seq.) without the existence of any flattened locations.

The present invention contemplates the individual mats capable of exhibiting any flexible profile or configurations, and as such as which can be tailored where necessary in order to adequately conform the mat to the given surface profile of the roof 2. To this end, the flexible material incorporated into the mat construction can exhibit any arrangement of fold lines or bends, such as which are also known as living hinges, in order to accommodate the specified profile of the metal roof 2 and in order to provide an adequate and nonskid platform for the user. The magnetic underside layer can further include any corresponding spacing or reconfiguration, such as including providing the attracting layer as a plurality of individual magnetic strips in spaced fashion, and in order to match the profile of the metal roof surface.

Figure 12:
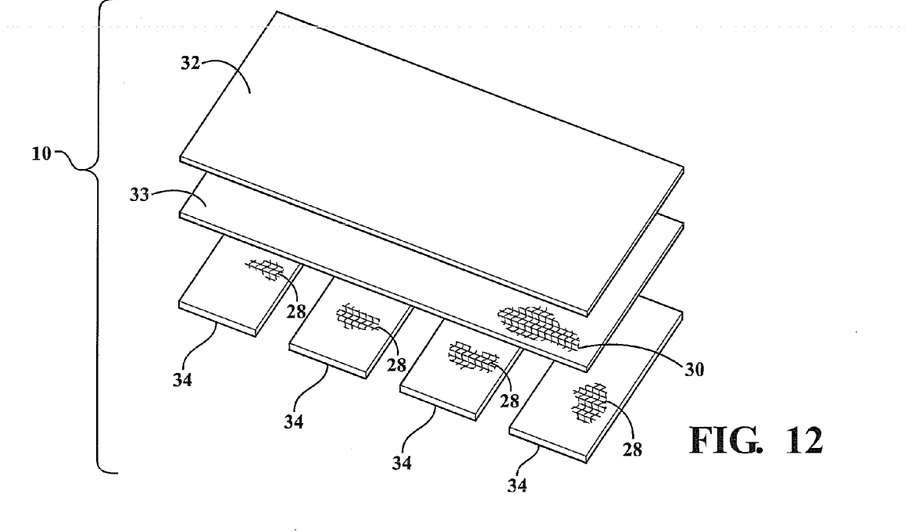
FIG. 12 is an exploded view of the safety mat of FIGS. 11A-11B.
Figure 13:
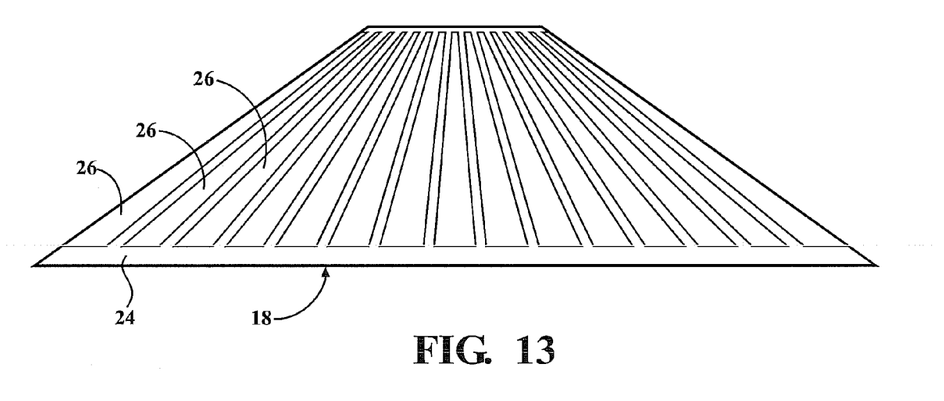
FIG. 13 is an illustration of a full layer of magnetic hacking material in a generally grid profile nonskid strips according to one non-limiting configuration of the present invention.

The full magnetic attracting underside layer 18, such as again shown in FIG. 13, can (without limitation) also be configured with a grid design such as incorporating a multi (four) sided outer form or perimeter 24, between which extend individual strips or lengths of nonskid portions 26 the configuration of which facilitates bending or articulating when placed upon any irregular or peak/valley surface profile associated with the corrugated steel roof. The underside layer 18 can also be adhered (such as by gluing as depicted by adhesive layers or strips 28 and 30 in FIG. 12) to the underside of the skid-resistant (e.g. neoprene) mat 10, in order to provide the desired properties of grip and flexible/hinged construction of the mat 10 to accommodate a given metal roof surface profile.

Figure 8:
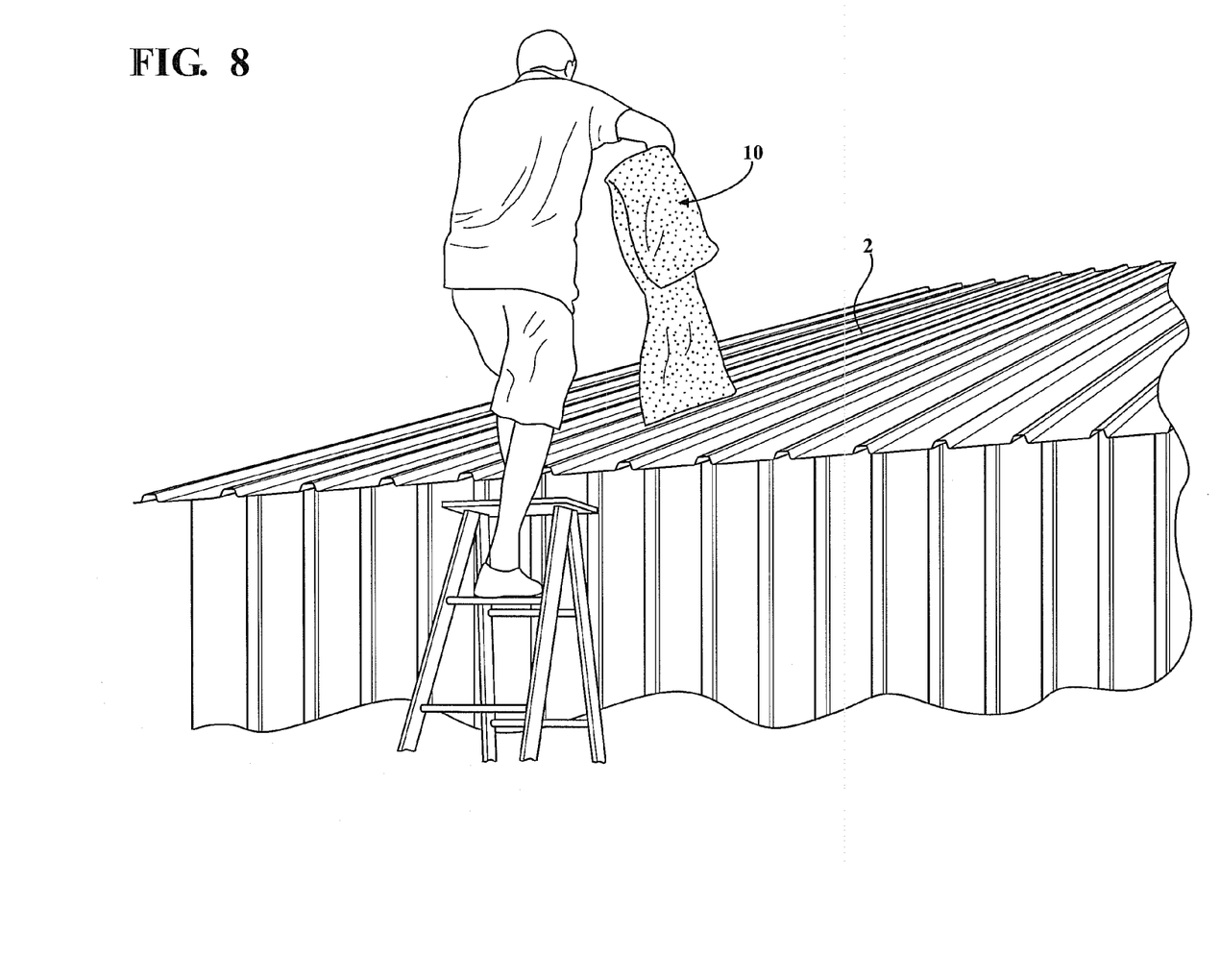
FIGS. 8-10 illustrate a succession of views of an installation protocol for applying a plurality of nonskid mats upon a metal peaked roof construction.
Figure 9:
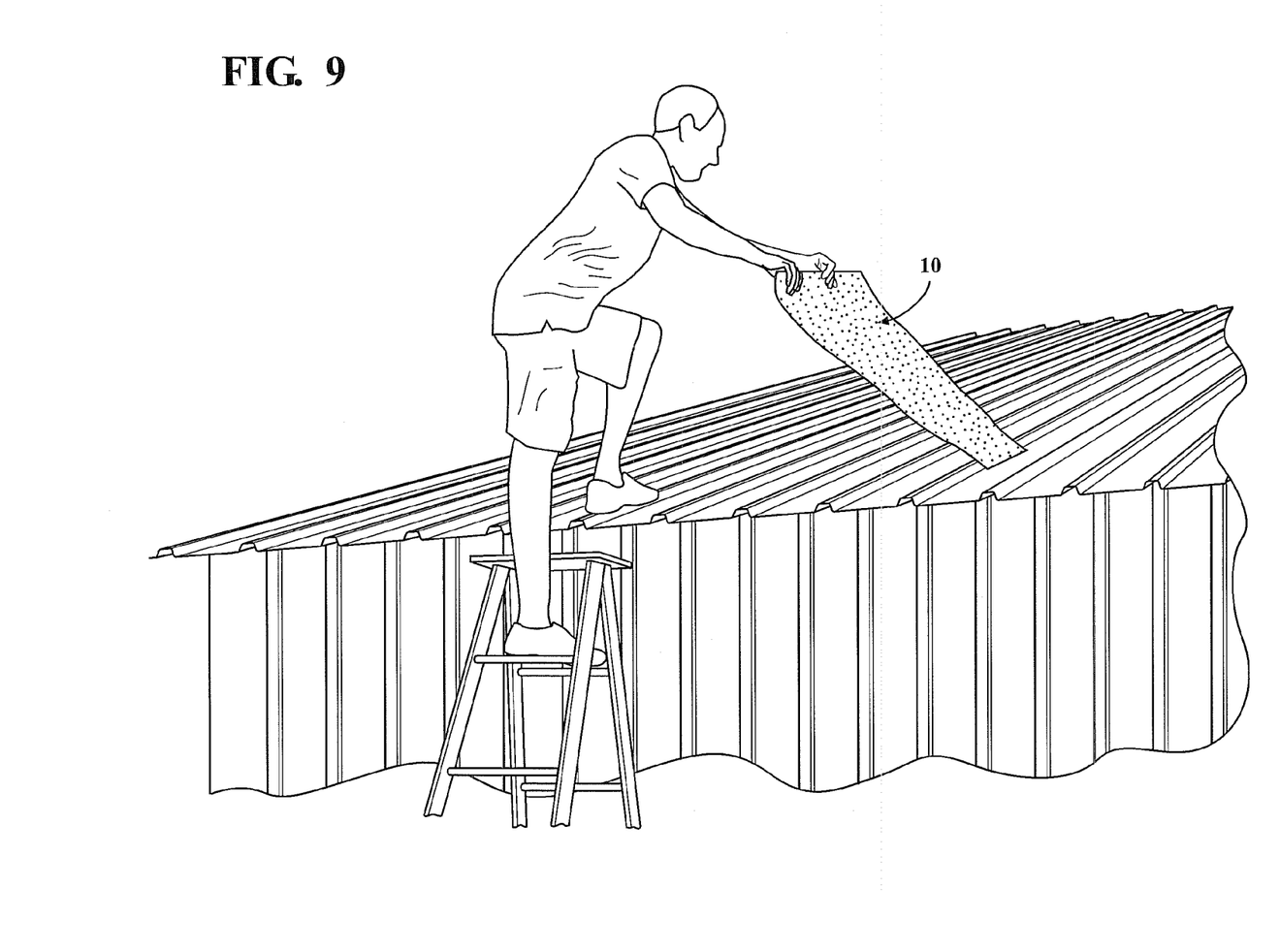
Figure 10:
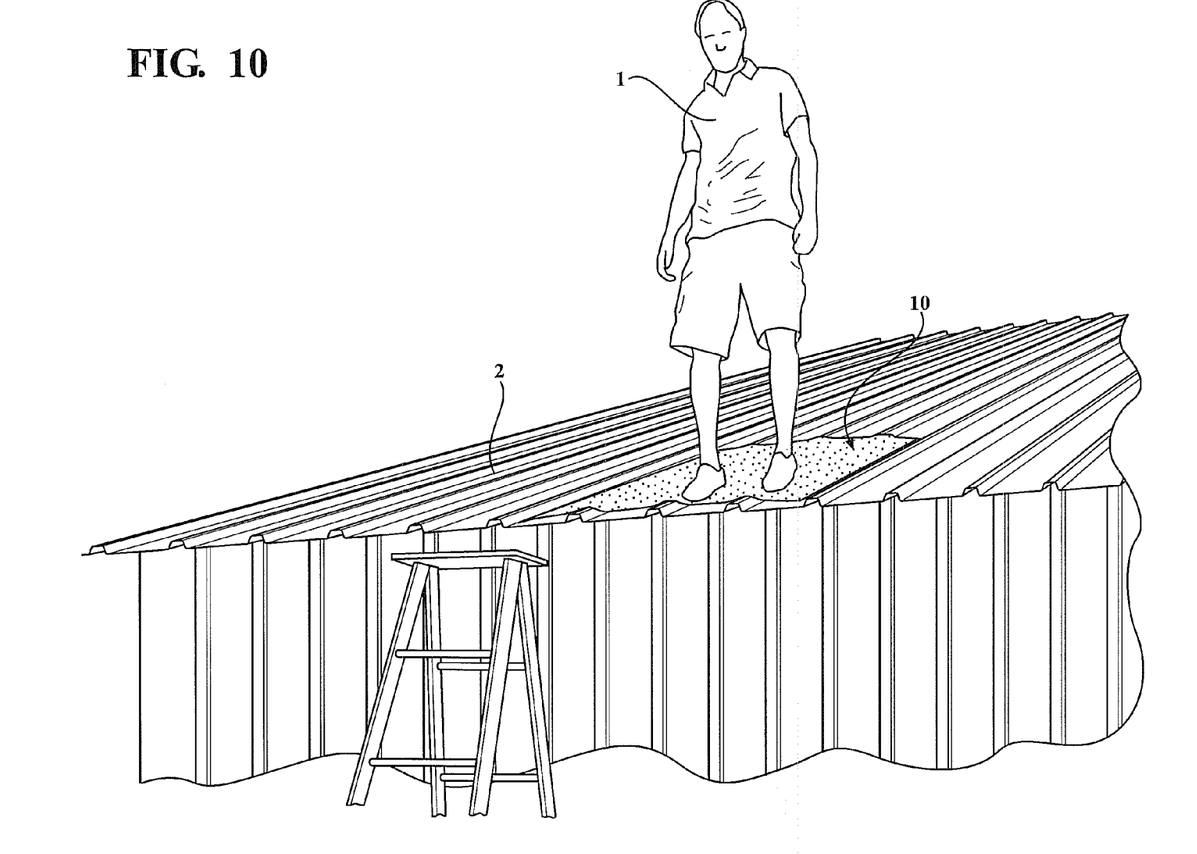

FIGS. 8-10 present a further series of environmental perspective views illustrating the application of the mat 10 onto the sheet metal roofing construction 2, consistent with that previously depicted in FIG. 2-5, according to the known art and which again exhibits multiple and reverse angled bends, this best shown in the assemble view of FIG. 10 and by which a user 1 is capable of standing upon the slip-resistant exterior surface of the mat 10 without the mat shearing or slipping relative to the metal roof, again due to the consistent magnetic attracting profile established across the magnetic surface area of the mat with the underlying roof. As previously described, the construction of the mats are such that they provide adequate non-slipping magnetic attracting forces when placed upon the metal roof surface, with the antiskid upper surface further establishing secure footing to the user standing there upon, such as in the instances of either wet or dry weather.

Aside from providing a solid foothold provided by the magnetically adhering mats further assists in reducing body stress and accidents. The mats are further designed to be easily moved and repositioned across the metal roof by the user using a plurality of mats while supported thereupon.

Figure 7:
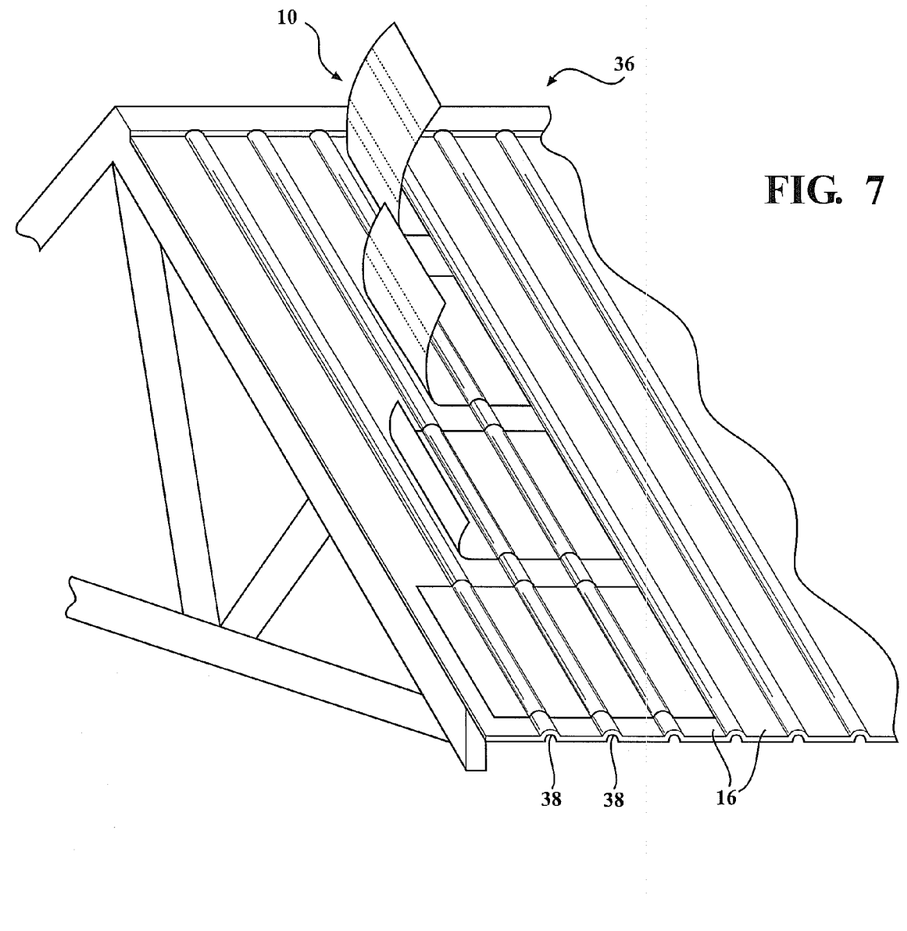
FIG. 7 is a further assembly protocol utilizing the safety mats of FIGS. 11-12 and illustrating the manner in which the mats can be applied to the sheet metal roofing in order to provide a more secure walkway surface.

The present invention further provides an effective method for applying a plurality of mats upon a metal roof surface, depicted in FIG. 7, such as including the steps of reposition-ably adjusting any plurality of individual mats in end-to-end and/or side-by-side fashion upon the metal roof, and as such as to permit the user to walk between any desired points in a more secure fashion. The elevations or peaks of the metal roof sheeting 4 in FIG. 5 are accommodated by the design of the living hinge 14, mat 10, FIG. 5 by conforming to the peaks, providing better surface contact, thereby, further assisting in providing antiskid support to the user.

Figures 11A, 11B:
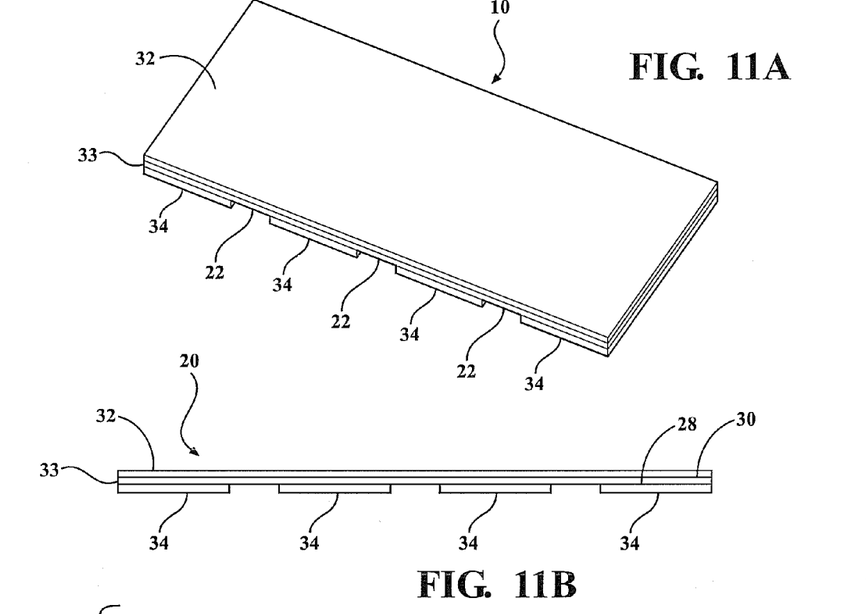
FIGS. 11A-11B are perspective and side views of a safety mat according a further embodiment and which includes an upper-most nonskid (e.g. neoprene or other rubberized) material layer, (tear-resistant or ripstop fabric layer), an intermediate adhesive layer, and a plurality of subset spaced and underside attached magnetic strips.

Proceeding to FIGS. 11A-11B and FIG. 12, a series of perspective, side and exploded views are respectively shown of a safety mat 20 according to a further embodiment, which includes an upper-most nonskid material layer 32, an intermediate adhesive layer 33 and a plurality of subset spaced and underside attached magnetic strips 34, the intermediate 33 and underside magnetic strips 34 as shown each including an adhesive covering as depicted at 28 and 30. The upper layer 32 can again exhibit any nonskid rubberized consistency and can exhibit any thickness, such as ⅛". The intermediate adhesive coated layer 33 can further include, without limitation, any type of tear-resistant material, also termed a rip-stop fabric, such as exhibits flexural properties. In combination with the upper surface attached neoprene or neoprene coated material layer 32 (also understood to include any other potential skid-resistant and flexible material) the intermediate rip-stop 33 adhesive layer 30 and the lower attached magnetic strips 34 provide any desired degree of flex/bend in application.

FIG. 7 illustrates, generally at 36, a further assembly protocol utilizing the safety mats according to any of the embodiments described herein, with a plurality of four such mats 10 being referenced. Consistent with the previous figure descriptions of FIGS. 8-10, a plurality of mats 10 can be placed in successive and spaced fashion to provide a more secure walkway surface for an individual upon the typically (but not necessarily) peaked and angled profile established by the metal roofing construction, a further configuration of which is shown at 38, FIG. 7.

The metal roof 36 as shown FIG. 7 further includes a plurality of alternately configured and spaced apart side profiles, these depicted by semi-circular shaped profiles or configuration 38, and over which the mats 10 are capable of closely and snugly adhering, again due in part to the flexible nature of both the upper skid-resistant layer 32, in FIG. 11A-11B, intermediate rip-stop fabric layer 33, adhesively affixed layer 30, affixed to lower magnetic strips 34, which can again be spaced apart as shown in FIGS. 11-12. The spaced arrangement and location of the magnetic strips can further be configured for other metal roofing profiles.

Figure 14A:
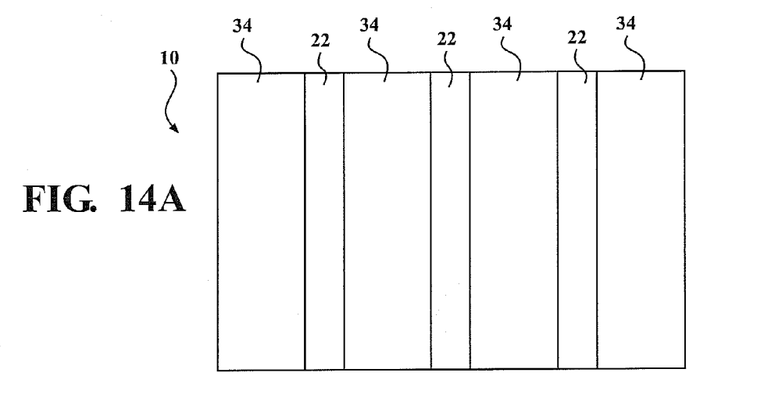
FIGS. 14A-14B are bottom and side view illustrations of a further variant of magnetic adhering safety mats such as which can exhibit any type of flex pattern for conforming when placed upon the metallic roof.
Figure 14B:
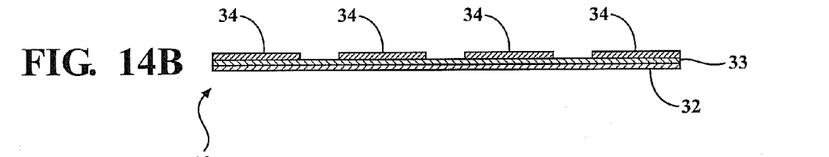

Without limitation, the mat 10 in FIGS. 14B and 15B can be configured such that the magnetic strips 34 can include flexural patterning so that they provide enhanced gripping upon the flattened or irregular metal surfaces associated with the type of metal roofing installations such as faux and non-traditional patterning. As with previous variants, and as will be further described, the spaced apart configuration of the magnetic strips define living hinge locations 14 the configuration and arrangement of which can further be modified in order to maintain enhanced magnetic grip while requiring minimal lift force for moving and replacing mats.

It is further understood that any of the number, arrangement and/or profile of the magnetic strips can be modified as in sectional view 12, FIG. 15A with the scope of the invention in order to provide any desired gripping characteristics such as the quartered diamond pattern 14 shown in the enlarged view of FIG. 16, for a given surface configuration of a metal roof.

FIG. 16 is a sectional illustration taken from FIG. 15A and once again showing a quartered diamond style of pattern of individual magnets associated with each of a more flexible magnetic bottom layer (see selected strip, portion or layer as defined at phantom outline 12 of FIG. 15 A). Such a pattern can be limited to just the magnetic strips, or can be further integrated into the upper rubberized neoprene layers. This in order to provide an increased degree of flex or bend and thereby establish greater or enhanced surface area contact when placed upon an existing steel roof 2. Although not shown, it is further understood that existing metal roofing 2, apart from exhibiting any of the profiles shown herein, can further be produced with any of a texturized or otherwise decorated surface which can exhibit an imitation steel roofing pattern not limited to any of cedar shake, terra cotta, slate tile, asphalt-like shingle or the like.

Figure 17:
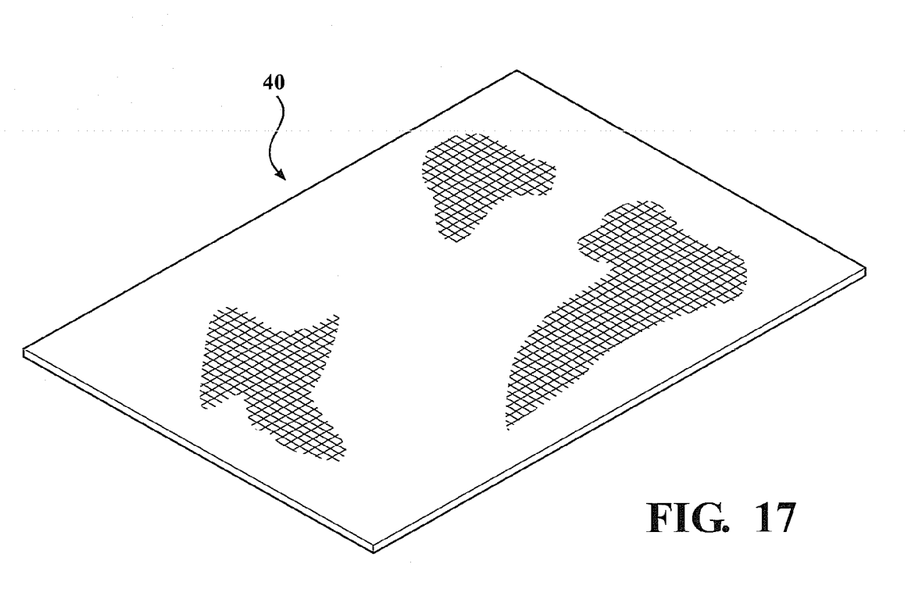
FIG. 17 is an illustration of a single layer chemical, self-assembled or extruded programmable particle material which can be constructed as a nonskid mat according to a further possible variant of the present invention.

FIG. 17, is a non-limiting embodiment illustration of a single layer chemical, self-assembled or extruded programmable particle material, and/or 3D printer produced representation of the invention in a sheet mat form at 40 and which can again include any desired dimensions with a suitable thickness (typically at least ⅛ of an inch or more). The unique construction of the mat 40 is further understood to provide combined magnetic adherence to the metal roof surface, as well as adequate nonskid shear-resistant surface mat embodiment support to a user, similar to that established by any of the multi-layer configurations described herein.

While not specifically described herein, it is understood that any suitable injection molding or extrusion process can be employed for creating the desired mat configuration. It is further envisioned that, as part of the matrix or construction of such as single layer mat, a flexural grid or other internal support can be integrated into the material construction in order to provide enhanced strength while retaining the desired flex hinge aspects.

Figure 6:
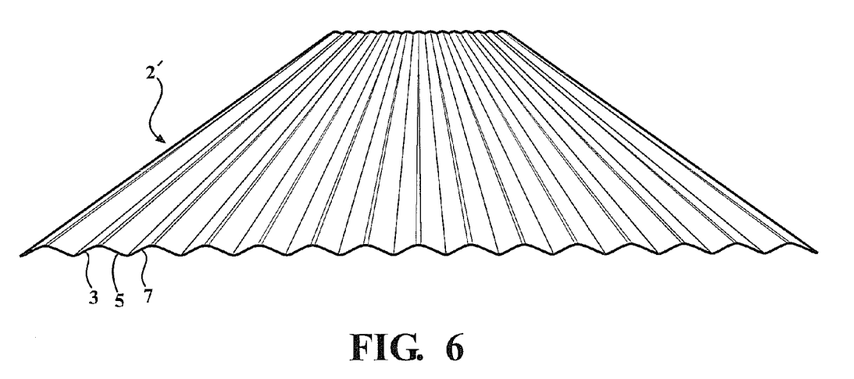
FIG. 6 is a upper perspective of another variant of alternating peak and valley sheet metal roofing construction, further to that depicted in FIGS. 1-5.
Figure 18:
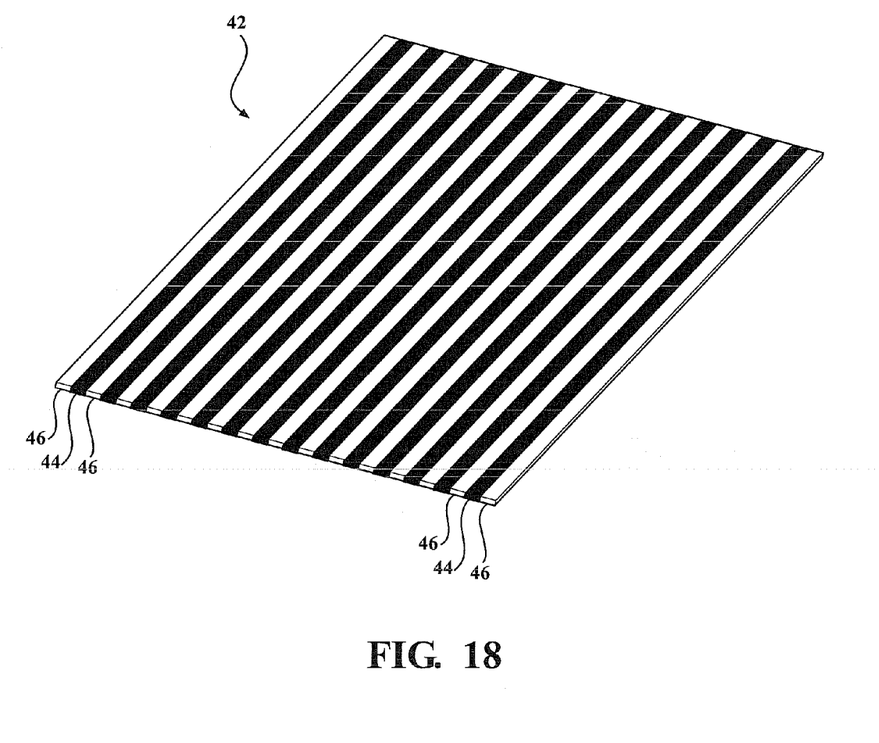
FIG. 18 is an illustration of another single layer mat design incorporating a first plurality of skid-resistant strips/portions in combination with an alternating second plurality of flex-hinged connecting and magnetic strips/portions.

Finally, FIG. 18 is an illustration of another single layer mat design, generally at 42, incorporating a first plurality of skid-resistant strips/portions 44 (these additionally providing living hinge functionality) in combination with an alternating second plurality of flex-hinged connecting and magnetic strips/portions, at 46, the mat configuration of FIG. 18 being particularly suited for providing nonskid support when placed upon the continuous reverse-angled roof design 2 of FIG. 6, it being understood that other configurations are envisioned for supporting upon and gripping other roof surfaces not limited to those depicted herein.

Similar to FIG. 17, the single layer design of FIG. 18 can be produced in a suitable material forming process, such in this instance, contemplating the magnetic strips being pre-placed in their desired spaced apart manner within a mold interior, following which the skid-resistant strips are injected in-between. A variation of this design can further envision the spaced magnetic strips 66 being embedded within a thicker skid-resistant layer 44 (the magnetic strips effectively seating within underside facing pockets created within the injection molded or like formed rubberized layer).

Without limitation, the present invention contemplates any mat design, having one or more layers, which are constructed of any rubberized or other skid-resistant material, further any mesh, weave, injection molding, 3D printing, extrusion, or other flexible article, and which further include magnetic/adhering aspects which are either incorporated into a single layer design or configured as additional strips or portions adhered to an underside surface of the mat, this in order to provide both enhance gripping to the metal roof surface as well as to accommodate the variances in the surface configuration of the metal. To this end, the design of the mat and its magnetic adhering portions can be modified in any way desired in order to establish flex locations between any such peaks and valleys in the metal roofing in order to maximize the effective surface area of magnetic attraction in order to minimize instance of slippage or shear of the mat when placed upon the ferritic metal roof.

For the purpose of constructing one style mat as in FIG. 12, cut a 21"×32" sheet of neoprene nonskid rubber, a sheet of equal size tear or abrasion resistant fabric (such as ripstop). Cut 4, 5"×21" strips of 5/32" flexible magnetic sheeting. Using flexible PVC glue, apply a layer of adhesive to bottom side of neoprene sheeting and a layer of adhesive to one side of ripstop fabric. Place adhesive layer sides together aligning edges. Apply a layer of adhesive to non-magnetic side of magnetic strips. Apply a layer of adhesive to the ripstop fabric underside. Adhere magnets at outside edges of corresponding length and place remaining strips evenly from each other creating the living hinge 14, as in FIG. 11A, as depicted in FIG. 1-5. This design of the completed mat 10 may be used on a steel sheet metal roof with peak or rib lines separated by 7" to 9" on center.

Having described my invention, other and additional preferred embodiments will become apparent to those skilled in the art to which it pertains and without deviating from the scope of the appended claims.

We claim:

1. An antiskid mat adapted to being applied atop a ferritic metal roof, comprising:
   a body having a single layer incorporating a first plurality of skid-resistant and flexible strips in combination with an alternating second plurality of flex-hinged connecting and magnetic strips;
   said body exhibiting flexible properties and having a generally planar shape with a length, width and thickness; and
   said body having an antiskid exterior surface and a magnetic attracting underside such that placement of said material upon the metal surface is adapted to securely support the weight of a user supported on the mat without slippage relative to the roof.

* * * * *